(12) United States Patent
Yeung et al.

(10) Patent No.: US 8,089,715 B1
(45) Date of Patent: Jan. 3, 2012

(54) SPLIT SECTOR FORMATTING OF STORAGE DISKS

(75) Inventors: Kwok W. Yeung, Milpitas, CA (US); Kin Ming Chan, Milpitas, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 487 days.

(21) Appl. No.: 11/345,621

(22) Filed: Feb. 1, 2006

(51) Int. Cl.
*G11B 5/09* (2006.01)

(52) U.S. Cl. .................. 360/48; 360/31; 360/51; 360/53

(58) Field of Classification Search .................. None
See application file for complete search history.

(56) References Cited

U.S. PATENT DOCUMENTS

| | | | |
|---|---|---|---|
| 4,811,124 A * | 3/1989 | Dujari et al. | 360/49 |
| 4,811,125 A * | 3/1989 | Sengoku | 360/51 |
| 5,212,677 A * | 5/1993 | Shimote et al. | 369/53.17 |
| 5,319,627 A * | 6/1994 | Shinno et al. | 369/53.17 |
| 5,844,911 A * | 12/1998 | Schadegg et al. | 714/710 |
| 5,963,386 A * | 10/1999 | Assouad | 360/48 |
| 6,034,831 A * | 3/2000 | Dobbek et al. | 360/53 |
| 6,151,180 A * | 11/2000 | Bang | 360/53 |
| 6,185,058 B1 * | 2/2001 | Dobbek et al. | 360/48 |
| 6,295,176 B1 * | 9/2001 | Reddy et al. | 360/48 |
| 6,336,202 B1 * | 1/2002 | Tsuchimoto et al. | 714/768 |
| 6,449,111 B1 * | 9/2002 | Kool et al. | 360/48 |
| 6,556,365 B2 * | 4/2003 | Satoh | 360/48 |
| 6,560,718 B1 * | 5/2003 | Wilson | 714/5 |
| 6,671,114 B2 * | 12/2003 | Bang | 360/48 |
| 7,206,150 B2 * | 4/2007 | Koshkina et al. | 360/53 |
| 7,589,926 B2 * | 9/2009 | Richmond et al. | 360/48 |
| 2002/0181131 A1 * | 12/2002 | Lim et al. | 360/31 |
| 2003/0191982 A1 * | 10/2003 | Arakawa et al. | 714/8 |
| 2006/0044978 A1 * | 3/2006 | Oh | 369/53.17 |
| 2007/0033493 A1 * | 2/2007 | Flake | 714/770 |
| 2007/0168838 A1 * | 7/2007 | Bentvelsen et al. | 714/770 |

* cited by examiner

*Primary Examiner* — Dismery Mercedes
(74) *Attorney, Agent, or Firm* — Van Pelt, Yi & James LLP

(57) ABSTRACT

Formatting a storage disk is disclosed. A first portion of a sector of the storage disk is defined. The first portion precedes a defect and has a first length that varies based on a detected location of the defect. A second portion of the sector of the storage disk is defined. The second portion follows the defect and has a second length that varies based on the detected location of the defect.

26 Claims, 12 Drawing Sheets

SPLIT SECTOR FORMATTING OF STORAGE DISKS

BACKGROUND OF THE INVENTION

Storage disks are frequently used to store digital data. For example, a user may store digital photographs, digital songs, or digital videos on a computer disk drive that includes one or more storage disks. As digital content becomes increasingly popular, consumer demand for storage capacity may correspondingly increase. The storage capacity of a disk may be limited by formatting of the disk. During formatting, a storage disk is scanned for defects and is divided into smaller units of storage based on detected defects. Improved formatting techniques may improve the storage capacity of storage disks.

SUMMARY OF THE INVENTION

A storage disk is formatted by defining a first portion of a sector of the storage disk. The first portion precedes a defect and has a first length that varies based on a detected location of the defect. A second portion of the sector of the storage disk is defined, where the second portion follows the defect and has a second length that varies based on the detected location of the defect.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer program product embodied in a non-transitory computer readable storage medium and comprising computer instructions. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Formatting a storage disk is disclosed. A first portion of a sector of a storage disk is defined. The first portion precedes a defect and has a first length that varies based on a detected location of the defect. In some embodiments, the defect is a result of a manufacturing imperfection. A second portion of the sector of the storage disk is defined. The second portion follows the defect and has a second length that varies based on the detected location of the defect. In some embodiments, a sector with such a first and a second portion is referred to as a split sector. Using split sectors may enable a more efficient formatting of a storage disk with defects and may increase storage capacity.

Figure 1:
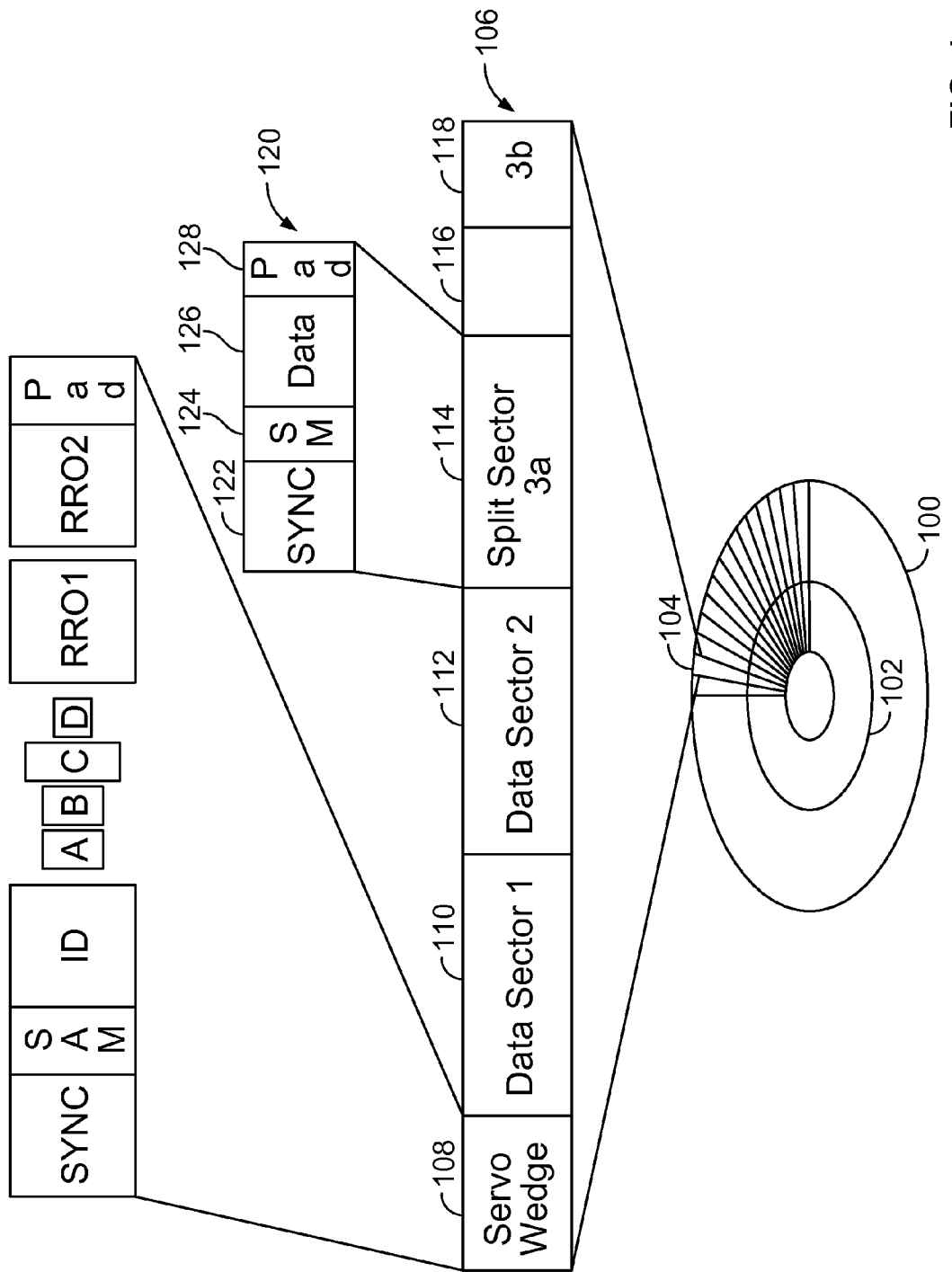
FIG. 1 is a diagram illustrating an embodiment of a formatted storage disk that includes a split sector.

FIG. 1 is a diagram illustrating an embodiment of a formatted storage disk that includes a split sector. In the example shown, the storage disk may be a disk used in a disk drive. Formatting is applied to divide the raw storage media of disk 100 into sectors that are used to store data. The storage capacity of a disk may therefore depend upon the formatting. Other factors that may affect storage capacity include defects in the disk. Parts of a disk with a defect may not be readable or writeable to a degree required by a storage system and may reduce storage capacity. The amount of overhead data may affect storage capacity. Formatting may assign some parts of a storage disk to be used for storing overhead data, as opposed to storing data from a user or an application.

Storage disk 100 includes track 102. Tracks may form concentric, non-overlapping circles on disk 100. When reading from or writing to storage disk 100, a head may hover above a track as the disk spins. The head may read or write data magnetically as it hovers above a track. In some embodiments, data is stored by some other technique, such as optical storage. Numbers may be assigned to tracks to distinguish between tracks and identify a particular track. Track 102 illustrates one track on disk 100. Storage disk 100 may include wedges radiating outward from the center of disk 100. Wedge 104 illustrates one wedge of disk 100. Wedges may be used to find a particular sector on storage disk 100 more quickly and may be numbered.

Format slice 106 illustrates the formatting for part of track 102, including sectors used to store data. A head accessing this part of track 102 may use the formatting shown in format slice 106 to store data. For example, when storing data in track 102, a head may write 512 bytes to data sector 1 110, 512 bytes to data sector 2 112, and 512 bytes to portions 3a 114 and 3b 118 of the split sector.

Servo wedges, such as servo wedge 108, are used to store overhead data associated with tracking. Multiple servo wedges may radiate outward from the center of disk 100. In some applications, a storage disk contains 200 servo wedges. Servo wedge 108 corresponds to one of these servo wedges cross sectioned by track 102. A head reads the overhead data in servo wedge 108 and uses the information to correct itself as it hovers above track 102. Servo wedge 108 may be used to center the head above track 102 and prevent the head from drifting into the space above an adjacent track and unintentionally accessing another track.

Data sectors, such as sectors 1 110 and 2 112, are one type of sector that may be used to store data. In some applications, data sectors have a fixed capacity of 512 bytes for data storage. A data sector may include overhead data in addition to the 512 bytes of stored data. Occasionally, a defect is found is storage disk 100. A defect may be the result of manufacturing, such that part of the disk is not readable or writeable to a desired degree. In this example, there is no defect in the part of storage disk 100 occupied by data sectors 1 110 and 2 112. Data sectors may be allocated during formatting for parts of a storage disk that do not have manufacturing defects.

A split sector may be used for parts of a storage disk that contain a defect. A split sector is another type of sector used to store data and includes multiple, non-contiguous portions. Portions 3a 114 and 3b 118 of the split sector collectively may have the same functionality (e.g., storing data) and same storage capacity (e.g., 512 bytes) as data sector 1 110. Portion 3a 114 may have N bytes of storage capacity, and portion 3b 118 may have (512−N) bytes of storage capacity. Although this example illustrates a split sector comprising of two portions, a data sector may be split into three or more portions.

In this example, sectors are numbered and the same counter is used for data sectors and split sectors. The next sector following split sector 3 (not shown) is sector 4. Sector 4 may be a split sector or a data sector. In some embodiments, a different numbering is maintained for each type of sector. For example, if portions 114 and 118 are associated with the first split sector, the split sector may be assigned an identifier of 1.

Using split sectors for parts of a storage disk with a defect may result in a more efficient formatting compared to some other techniques. Defect portion 116 may include a manufacturing defect. Although the defective part of a disk may not be usable, some of the storage disk surrounding a defective part may be usable and may be included in a split sector. In some embodiments, defect portion 116 varies based on a detected defect. A smaller detected defect may result in a smaller defect portion 116. In some embodiments, split sectors are separated by a fixed length, regardless of the detected length of a defect. The fixed length may be based on an expected maximum length of a defect.

Although 512 bytes of storage capacity is described as an example, any storage capacity can be used. For example, a data sector or a split sector may have storage capacities of 1024 bytes, 2 KB, 4 KB, etc. The benefits of using split sectors may increase as storage capacity increases. For larger storage capacities, the cost of discarding an entire sector is correspondingly larger. Discarding a data sector of 4 KB is more expensive than discarding a data sector of 512 bytes. As storage systems transition to sectors with larger storage capacities, split sectors may become increasingly useful.

Split sector formatting 120 illustrates the components of portion 3a 114 of the split sector in some embodiments. The set of components included in portion 3a 114 may be the same set of components included in data sectors 1 110 and 2 112. In some embodiments, portion 3b 118 includes the same components as portion 3a 114. In some embodiments, portion 3b 118 includes a different set of components compared to portion 3a 114. Synchronization 122 may be used to acquire timing used in accessing data 126. Synchronization 122 may be a predefined sequence and may be used to obtain a sampling clock used in reading from data 126. Synchronization marker 124 may be a defined sequence used to indicate the start of data 126. Data 126 is used to store data, such as data from an application or a user. An error correction code may be applied to data stored in data 126, and information in pad 128 may be used in error correction processing. For example, pad 128 may be used to terminate error correction decoding. In some embodiments, pad 128 may be used for other things besides error correction. For example, a pad may be used for gap filling or any other function. In some embodiments, a pad comprises multiple portions, each of which is associated with a different usage.

Formatting may be performed before storage disk 100 is distributed. For example, formatting may be applied to storage disk 100 at a factory or assembly center. During formatting, sectors are allocated and assigned to a particular part of a track. Sectors may be allocated based on manufacturing defects detected on a storage disk and servo wedges.

Figure 2:
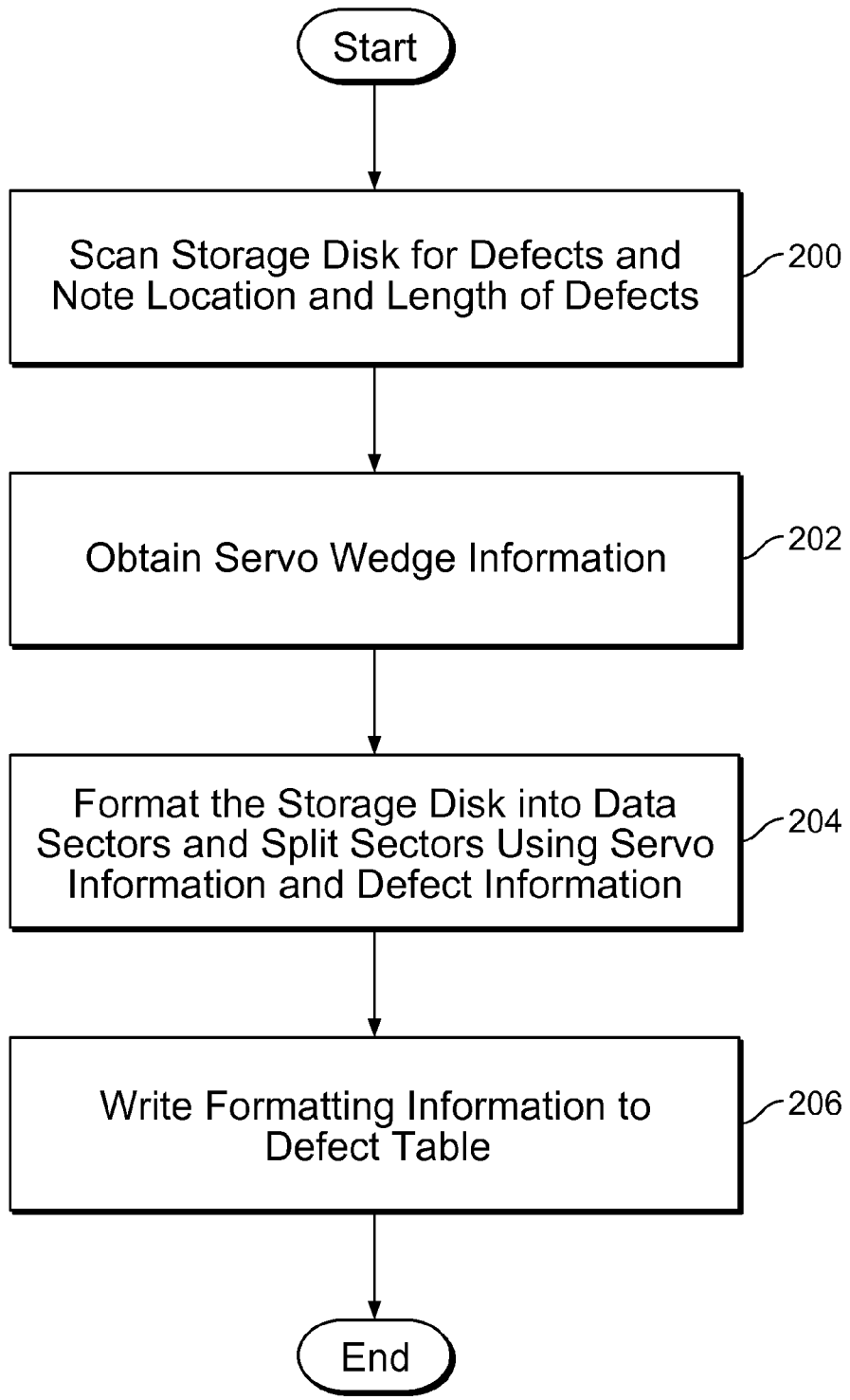
FIG. 2 is a flowchart illustrating an embodiment of formatting a storage disk.

FIG. 2 is a flowchart illustrating an embodiment of formatting a storage disk. In the example shown, the process may be performed at a factory or assembly center before a storage disk, or a storage system that incorporates the storage disk, is distributed. For clarity, some processes that are not directly related to formatting may not be presented.

At 200, a storage disk is scanned for defects and the location and length of defects are noted. A variety of methods may be used to scan the storage disk. Servo wedge information is obtained at 202. For example, the number of servo wedges and an angle or a size associated with the servo wedges may be obtained. At 204, the storage disk is formatted into data sectors and split sectors using servo information and defect information. For example, data sectors may be allocated in parts of a storage disk that are free from manufacturing defects. Split sectors may be allocated in the vicinity of defective parts of a storage disk. A defect portion, containing a manufacturing defect, may separate the first portion and second portion of a split sector. Numbers may be assigned to data sectors and split sectors for identification. Formatting information is written to a table at 206. A table may be used to communicate the formatting of a storage disk. A device accessing a storage disk may first reference a table.

A table may be updated periodically after a table is created. Parts of a storage disk may become defective over time and data sectors that were previously readable or writeable may become defective. These types of defects may be referred to as post-manufacturing defects. Post-manufacturing defects may result, for example, from a head scratching a storage disk. A scan of the storage disk may be performed periodically to detect post-manufacturing defects and prevent usage of sectors with post-manufacturing defects. Sectors with post-manufacturing defects may be added to a table so that they are not used.

In some embodiments, a replacement sector replaces a sector with a post-manufacturing defect. A replacement sector may have the same format as a data sector, but a replacement sector may remain unused until it replaces a previously functioning sector. In some applications, each track may include replacement sectors. An entry may be added to the table indicating that a particular replacement sector replaces a sector with a post-manufacturing defect.

Formatting and/or defect information associated with a storage disk may be stored in a variety of ways. In the examples described herein, a single table is used to store formatting and defect information. However, such information may be stored in any fashion. Depending upon the particular constraints and/or design goals of an implementation, an appropriate method may be selected. For example, two tables may be used. One table may be used to store formatting information. This table, which may be referred to as the formatting table, may be created during formatting. Subsequently, information associated with post-manufacturing defects may be written to a defect table. In another example, each type of command is stored in its own table.

Figure 3:
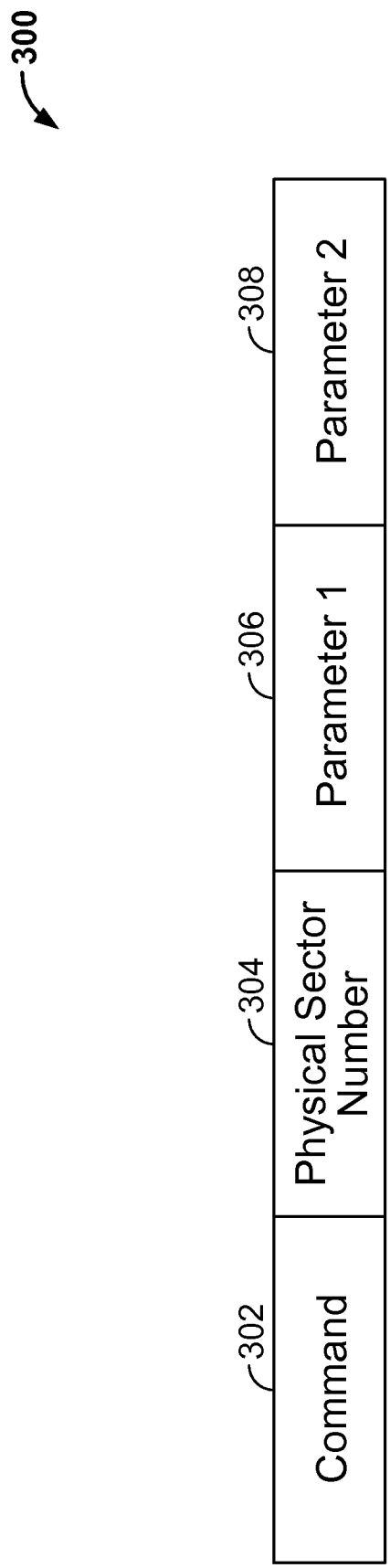
FIG. 3 is a diagram illustrating an embodiment of the structure of an entry in a table.

FIG. 3 is a diagram illustrating an embodiment of the structure of an entry in a table. In the example shown, a table may include multiple entries, each of which may use the structure of entry 300. Each entry in a table may communicate formatting information relating to a particular sector. For example, because of a manufacturing defect, a split sector may be allocated. An entry may be included in a table so that a device accessing a storage disk knows that a particular sector is a split sector. In some embodiments, a table is designed to minimize the number of entries. Some sectors may not have an associated entry in the table. In some embodiments, data sectors, such as data sector 1 110, do not have an associated entry in the table.

Entry 300 includes command 302. The length of command 302 may vary. For example, two bits may be sufficient for an implementation with four commands, whereas an implementation with more commands may use more bits. Multiple commands may be used and each command may be associated with a certain type of sector. For example, a "split" command may identify a split sector. A unique code may correspond to a "split" command. A command may define how the rest of the fields in an entry are interpreted. Some commands may not use all of the fields. For example, some commands may not use parameter 2 308. Fields that are not used by a particular command may be ignored when an entry containing that command is read.

Physical sector number 304 is used to identify a sector associated with the entry. The length of physical sector number 304 may vary depending on how a system is implemented. A sufficient number of bits may be selected based on a particular implementation. The number stored in a physical sector field may be the number assigned during formatting of a storage disk. Referring to the example of FIG. 1, a table may include an entry indicating that the third sector of format slice 106 is a split sector. The entry may have a "split" command followed by a physical sector number with a value of three.

Parameters 1 and 2 are optional and may not be used by some commands. The interpretation of parameters 1 and 2 may depend on the particular command used. The lengths of parameters 1 306 and 2 308 may vary depending upon the particular constraints or design goals of a particular implementation. In some embodiments, parameters 1 and 2 have a fixed length. That is, for any command, parameter 1 306 has a constant length and parameter 2 308 has a constant length. In some embodiments, the length(s) of parameter 1 306 and/or parameter 2 308 may vary depending upon the particular command specified in command 302. Parameters 1 306 and 2 308 may be implemented in a variety of ways.

This example illustrates one of a variety of ways to express formatting information of storage disk. In some embodiments, a table may be stored or expressed differently. The formatting of a particular sector in a storage disk may be expressed explicitly or implicitly in a table. Other information may be included in an entry to a table. A disk number, a track number, or a wedge number may be included in an entry in a table. Although particular bit-lengths, commands, and structures may be illustrated, a variety of methods may be used to store and communicate formatting information.

Figure 4:
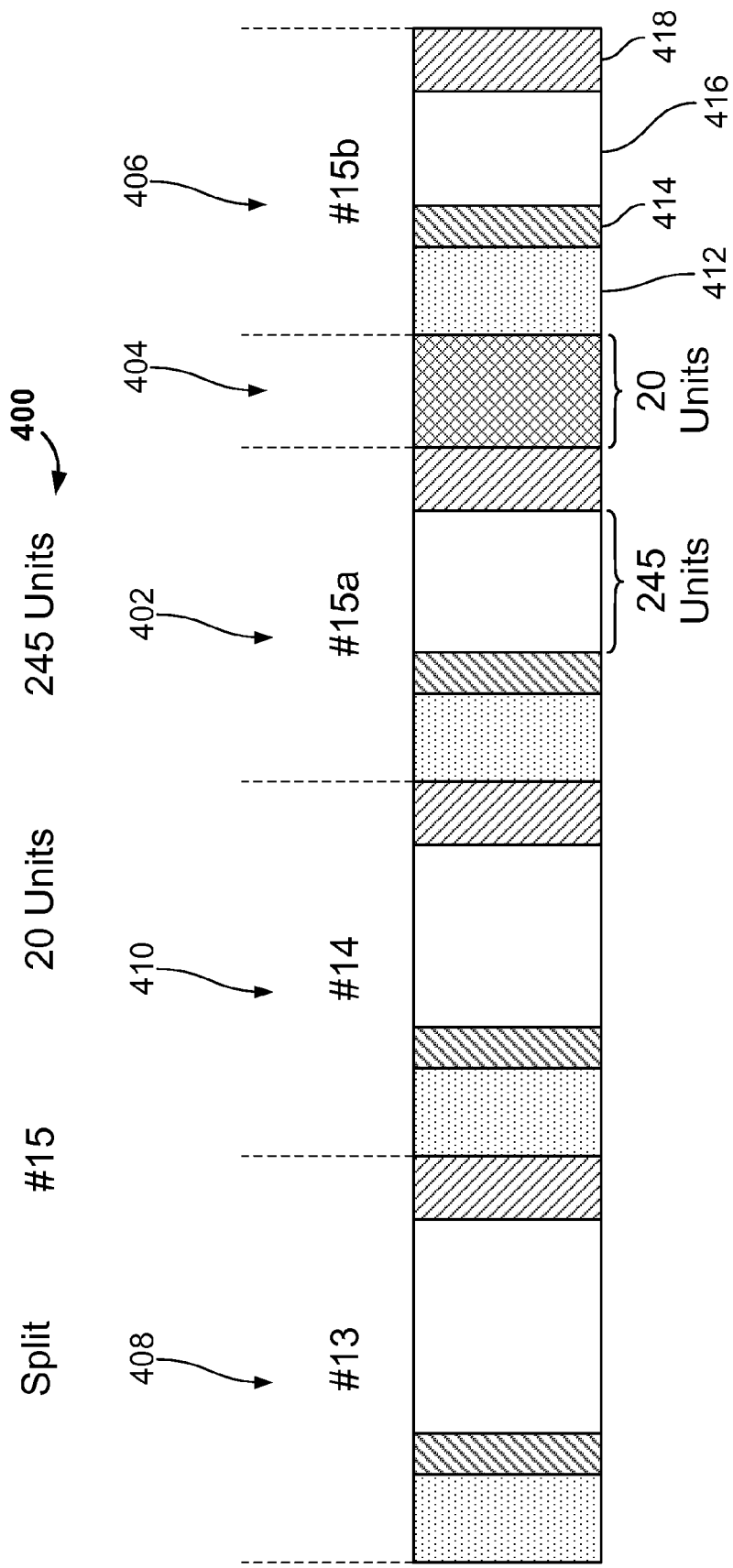
FIG. 4 is a diagram illustrating an embodiment of "split" command and an associated split sector included in a group of sectors.

FIG. 4 is a diagram illustrating an embodiment of "split" command and an associated split sector included in a group of sectors. In the example shown, entry 400 identifies the $15^{th}$ sector to be a split sector and may be included in a table. Portion 15*a* 402, the first portion of the split sector, is separated from portion 15*b* 406, the second portion, by defect portion 404. Defect portion 404 may include a manufacturing defect. During formatting, a split sector may have been allocated for the $15^{th}$ sector because of the manufacturing defect, and entry 400 may have been written to the table at that time.

In some embodiments, the length of defect portion 404 varies in accordance with a measured length of a defect. A shorter manufacturing defect may result in a shorter defect portion. In some embodiments, the length of defect portion 404 is a fixed length, and the actual length of the defect may be less than 20 units.

A unique three bit number may be used for a "split" command in the first field of entry 400. A "split" command indicates that a particular sector is a split sector. A value of 15 in the physical sector number field indicates that the identified split sector is the $15^{th}$ sector. In some embodiments, a table does not include entries that are associated with data sectors. For example, data sectors 13 408 and 14 410 may not necessarily have entries in a table.

With respect to a "split" command, parameter 1 defines the length of defect portion 404. Parameter 2 defines the storage capacity of portion 15*a* 402 of the split sector. The collective storage capacity of a split sector may be the same as a data sector. For example, data sectors 13 408 and 14 410 may each have a storage capacity of 512 bytes. Portion 15*b* 406 of the split sector may have a capacity of (512 bytes−245 bytes)= 267 bytes. In some embodiments, sectors have a storage capacity other than 512 bytes. In such cases, the storage capacity of portion 15*b* 406 changes accordingly.

In the example illustrated, portions 15*a* 402 and 15*b* 406 of the split sector have the same set of components. Portion 15*b* 406 includes synchronization 412, synchronization marker 414, data 416, and pad 418. In some embodiments, the components in the first portion and second portion of a split sector do not include the same set of components. For example, some components included in the first portion may not be included in the second portion of a split sector. If those components are associated with overhead data, the overall storage capacity of a disk may increase.

Although this example illustrates a split sector comprising of two portions, in some embodiments, a split sector includes three or more portions. Entry 400 may be modified as appropriate to describe a split sector with three or more portions. In some embodiments, constraints are placed on the format of a split sector containing three or more portions. For example, the first defect portion (between the first portion and second portion) and the second defect portion (between the second portion and third portion) may be constrained to be the same length. Constraints on the format of split sectors may enable entries that use fewer bits.

Figure 5:
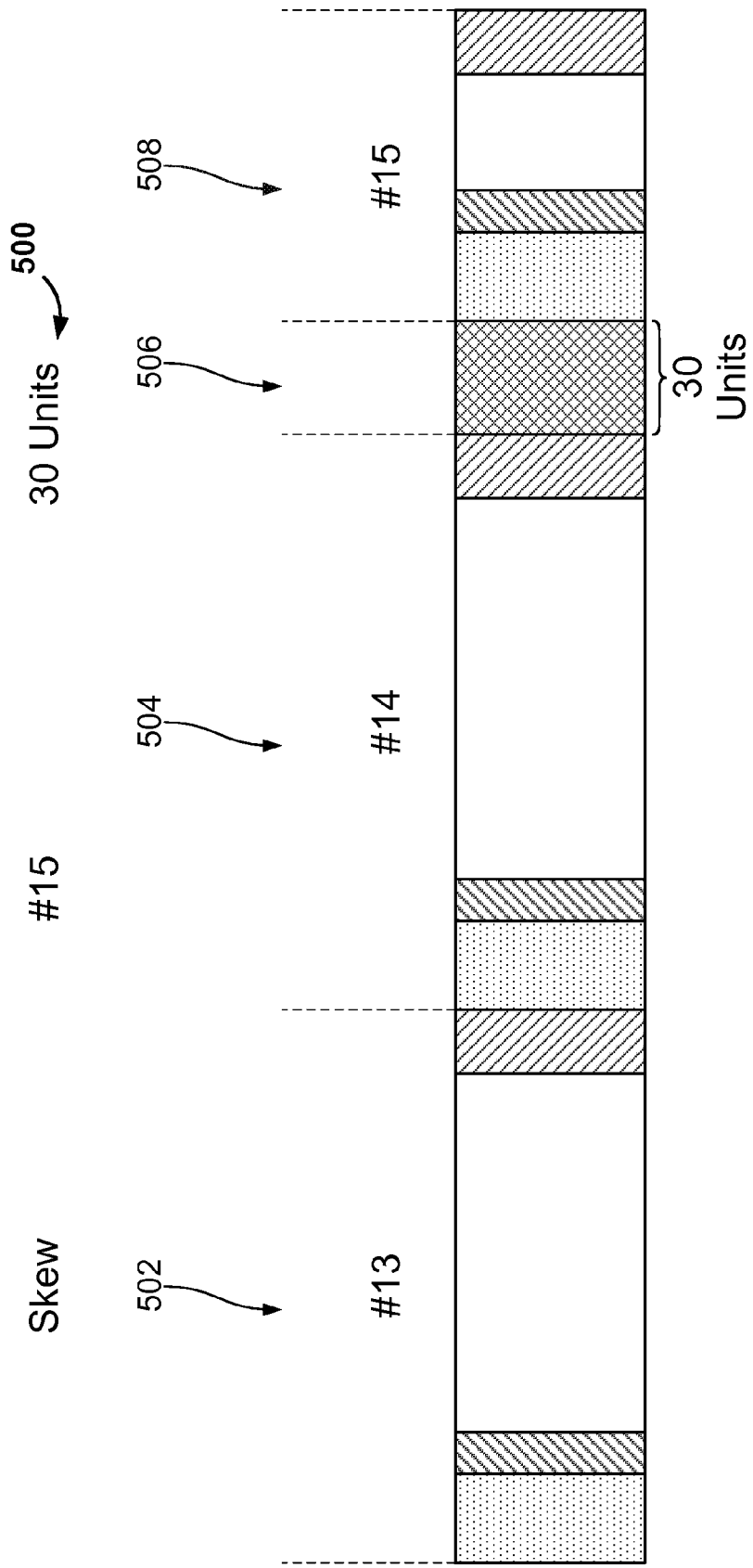
FIG. 5 is a diagram illustrating an embodiment of a "skew" command and an associated skew sector included in a group of sectors.

FIG. 5 is a diagram illustrating an embodiment of a "skew" command and an associated skew sector included in a group of sectors. In the example shown, a skew sector, such as skew sector 508, may be considered to be a special case of a split sector. A skew sector may be conceptualized as a split sector where the first portion has a length of zero. Skew sectors may be useful for certain placements of manufacturing defects. A manufacturing defect may occur relatively close to a sector boundary. For example, a defect may be located just after the end of data sector 14 504. There may not be sufficient space for a synchronization and a synchronization marker to be placed between the end of data sector 14 504 and the start of the defect. A skew sector may be used where the beginning of the skew sector is not adjacent to the end of the previous sector, which is sector 14 504 in this example. Defect portion 506 separates skew sector 15 508 and data sector 14 504.

Command 500 may be used in a table to identify a skew sector and communicate the start of the identified skew sector. A unique 3-bit number may be used in the command field to indicate a "skew" command. The physical sector number is set to 15, indicating that the 15$^{th}$ sector (sector 508) is a skew sector. Parameter 1 indicates the length of defect portion 506. As described above in the split sector example, defect portion 506 varies based on the length of the manufacturing defect in some embodiments. In other embodiments, defect portion 506 has a fixed length. Parameter 2 is not used by the "skew" command.

In some embodiments, the same command is used for split sectors and skew sectors. For example, the "split" command may be used to identify both split sectors and skew sectors. To distinguish between the two types, parameter 2 may be set to a zero value for skew sectors. A non-zero value in parameter 2 may indicate a split sector. Entries in a table may be expressed in a variety of ways.

The example commands described are not the only commands that can be used. Other commands may be used as appropriate. In some embodiments, a slip command is used. A slip command may be used if a defect is detected during formatting. An entry with a slip command and information about the affected sector may be included in a table.

Figure 6:
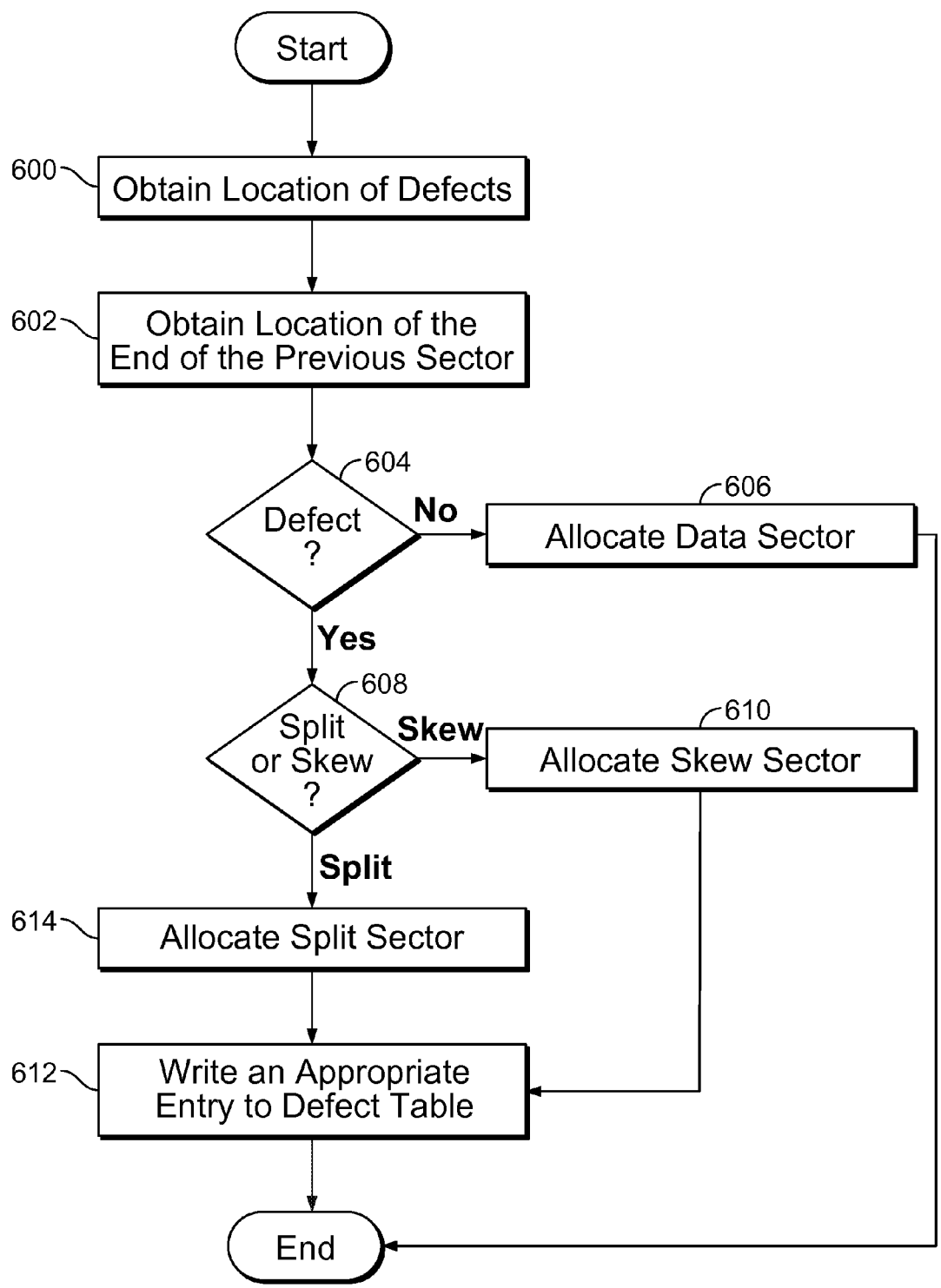
FIG. 6 is a flowchart illustrating an embodiment of allocating a sector used to store data during formatting of a storage disk.

FIG. 6 is a flowchart illustrating an embodiment of allocating a sector used to store data during formatting of a storage disk. In the example shown, the process may be performed before a storage disk, or a storage system that includes a storage disk, is distributed. The process may be repeated each time a sector is allocated. A sector used to store data in this example may be a data sector, a split sector, or a skew sector. Data sectors may be allocated for parts of a track that do not have a defect, and split sectors or skew sectors may be allocated for parts of a track that have a defect. At 600, locations of defects are obtained. The defects may be manufacturing defects. The location of the end of the previous sector is obtained at 602. For example, if the process is allocating the 15$^{th}$ sector of a track, the location of the end of the 14$^{th}$ sector may be obtained. In some cases, the previous sector may be a servo wedge. At 604, it is decided whether there is a defect. One data sector length beginning from the end of the previous sector may be considered in decision 604. A data sector length may be the sum of the lengths of the synchronization, synchronization marker, data, and pad of a data sector, such as data sector 13 408. If there is no defect within that part of a track, a data sector is allocated at 606. A number may be assigned to the data sector. A table may not necessarily include entries associated with data sectors.

If there is a defect, it is decided at 608 whether to use a split sector or a skew sector. The decision at 608 may be based on the location of the defect. If the distance from the end of the previous sector to the defect is less than a threshold, it may be decided to use a skew sector. If so, a skew sector is allocated at 610. A number may be assigned to the skew sector. An appropriate entry is written to a table at 612. For example, an entry with a "skew" command and the length of a defect portion may be written to the table, similar to entry 500. If it is decided to use a split sector, a split sector is allocated at 614. A number may be assigned to the split sector. At 612, an appropriate entry is written to a table. For example, an entry with a "split" command, the length of the defect portion, and the storage capacity of the first portion of the split sector may be written to a table. Entry 400 illustrates an example of an entry with a "split" command. The process may be repeated to allocate other sectors.

After a storage disk is formatted, some sectors may develop post-manufacturing defects over time. In some cases, a split sector may have a post-manufacturing defect. The following figure is an example of a command that may be used in association with sectors that have post-manufacturing defects.

Figure 7:
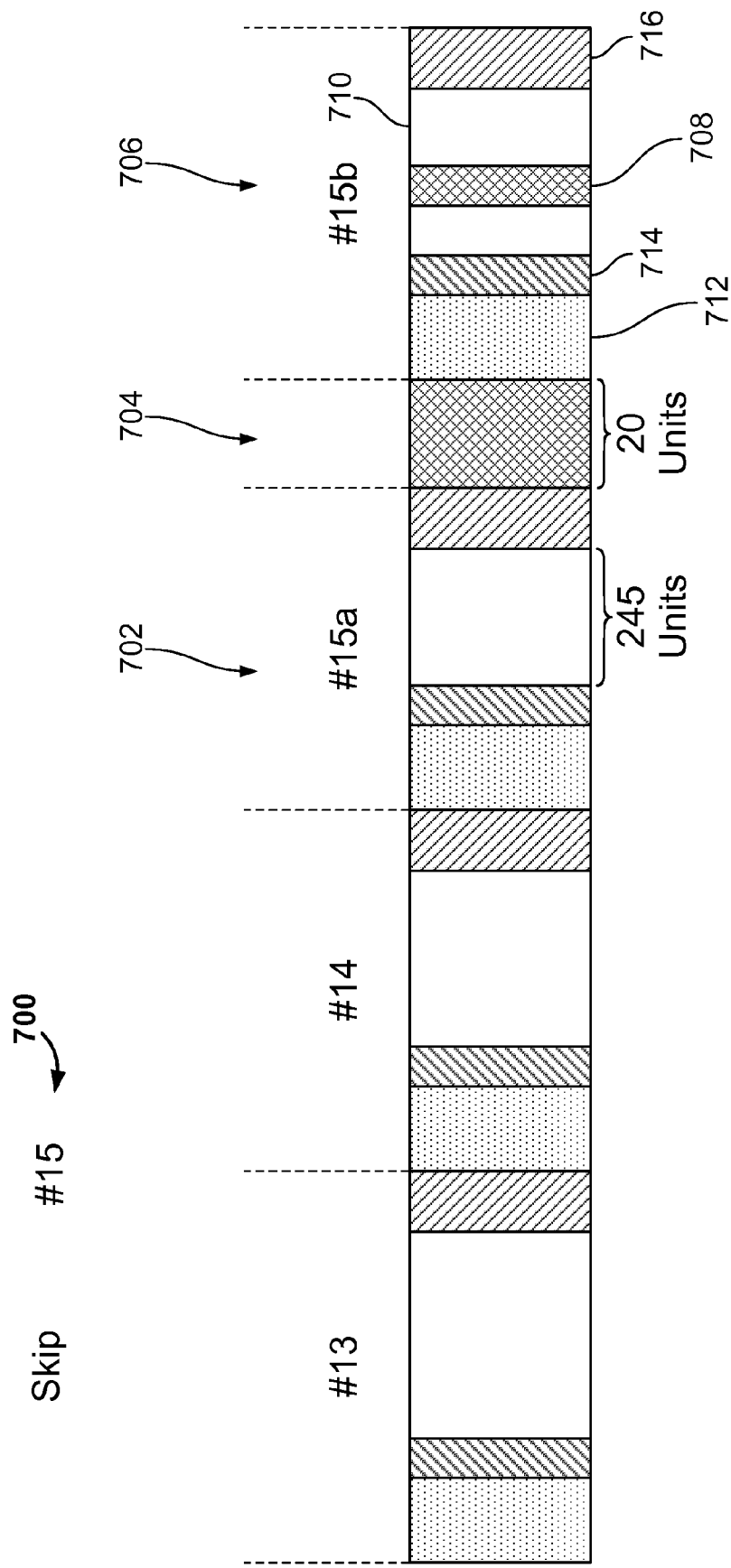
FIG. 7 is a diagram illustrating an embodiment of a "skip" command and an associated split sector with a post-manufacturing defect.

FIG. 7 is a diagram illustrating an embodiment of a "skip" command and an associated split sector with a post-manufacturing defect. In the example shown, defect portion 704 includes a manufacturing defect. The manufacturing defect is detected during formatting, and portions 15a 702 and 15b 706 are allocated around defect portion 704.

Some time after formatting, post-manufacturing defect 708 occurs in portion 15b 706. In this example, defect 708 is in data 710, which may be used to store user or application data. Portion 15b 706 may no longer be sufficiently readable or writeable. Entry 700 may be added to a table to indicate that the 15$^{th}$ sector is defective and should not be used to store data. A previous entry indicating that the 15$^{th}$ sector is a split sector may be maintained in the table. For example, a device accessing the 16$^{th}$ sector (not shown) may need to know that the 15$^{th}$ sector is a split sector.

In some embodiments, a replacement sector is substituted for a sector with a post-manufacturing error. Replacement sectors may have the same format as data sectors and may be allocated during formatting. A replacement sector may remain unused until it replaces a sector with a post-manufacturing defect. An entry in a table may identify the particular replacement sector that replaces a sector with a post manufacturing defect. Selection of a replacement sector may be based on seek time. For example, a replacement sector with the shortest seek time may be selected to replace a split sector with a post-manufacturing defect. This may be a replacement sector on the same track as the split sector.

In some cases, a post-manufacturing defect may occur in other components of a split sector. A post-manufacturing defect in synchronization 712, synchronization marker 714, or pad 716 may make portion 15b 706 unsuitable for storing data. Similarly, a post-manufacturing defect in the first portion of a split sector may make the split sector unusable. Entry 700, or another appropriate entry, may be added to the table in these cases.

In some embodiments, portions of a split sector do not include the same set of components. For example, the second portion of a split sector might not include some components associated with overhead data that are included in the first portion. This may reduce the amount of overhead information and may increase the overall storage capacity of a storage disk.

Figure 8:
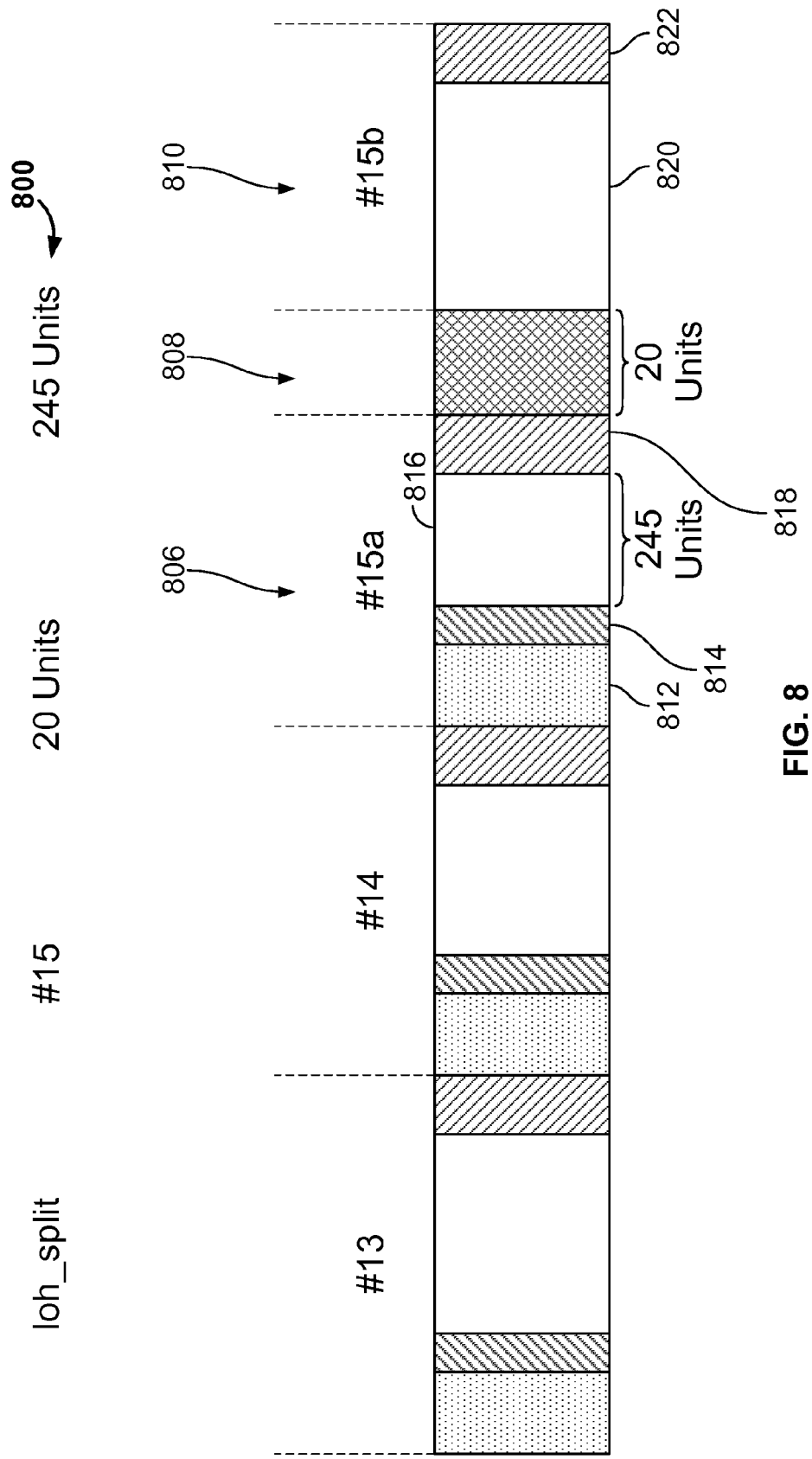
FIG. 8 is a diagram illustrating an embodiment of a "loh_command" and an associated low overhead split sector in a group of sectors.

FIG. 8 is a diagram illustrating an embodiment of a "loh_command" and an associated low overhead split sector in a group of sectors. In the example shown, portion 15b 810 does not include some components associated with overhead data that are included in portion 15a 806. Portion 15a 806 includes synchronization 812, synchronization marker 814, data 816, and pad 818. Data 816 is the component of portion 15a 806 used to store data. Synchronization 812, synchronization marker 814, and pad 818 contain overhead information. A split sector where at least one portion does not include some components associated with overhead data may be referred to as a low overhead split sector. A low overhead split sector may be more efficient than a normal overhead split sector, such as the example of FIG. 4. A sector with a shorter length may be used to store the same amount of data.

Separator 808 is located between portions 15a 806 and 15b 810 of the low overhead split sector. In some embodiments, separator 808 includes a defect, such as a manufacturing defect. In some embodiments, separator 808 includes a servo wedge. The length of separator 808 may be sufficiently short enough so that portion 15b 810 of the low overhead split sector does not need a synchronization and a synchronization marker.

Timing information used to access data stored in portion 15b 810 may be acquired using portion 15a 806. For example, a defined pattern in synchronization 812 may be used to obtain a sampling clock. Synchronization marker 814 may indicate the start of data 816. Using the sampling clock obtained, data stored in data 816 may be read. Error correction processing may be applied to the data read from data 816. Pad 818 may be used to terminate the error correction processing. During separator 808, a timing loop may be paused or frozen and information in separator 808 may be ignored. The timing loop may be released to read data 820 and pad 822. A device accessing portions 15a 806 and 15b 810 of the low overhead split sector may refer to entry 800 to obtain the length of separator 808 and determine when to release a timing loop.

Entry 800 indicates that sector 15 is a low overhead split sector. The command field of entry 800 is set to "loh_split". The physical sector number is set to a value of 15, indicating that the $15^{th}$ sector is a low overhead split sector. Parameter 1 is used to indicate the length of separator 808. Parameter 2 is used to indicate the storage capacity of portion 15a 806 of the low overhead split sector. In some embodiments, a low overhead split sector may include three or more portions. Some or all of the non-leading portions of a low overhead split sector may exclude overhead information, such as the synchronization and synchronization marker. Entry 800 may be modified as appropriate and written to a table.

A low overhead split sector may use any appropriate format. In some embodiments, the second portion of a low overhead split sector has a synchronization and a synchronization marker, and the synchronization in the second portion is shorter than that of the first portion. In some embodiments, the second portion of a low overhead split sector has no synchronization but has a synchronization marker. Alternatively, the second portion may have a shorter synchronization (compared to the first portion) and no synchronization marker. In some embodiments, the second portion has no synchronization and no synchronization marker. In some embodiments, overhead information other than the synchronization or the synchronization marker is excluded from at least one of the portions. Selection of overhead information to exclude or shorten may be based on the particular considerations of an application.

Figure 9:
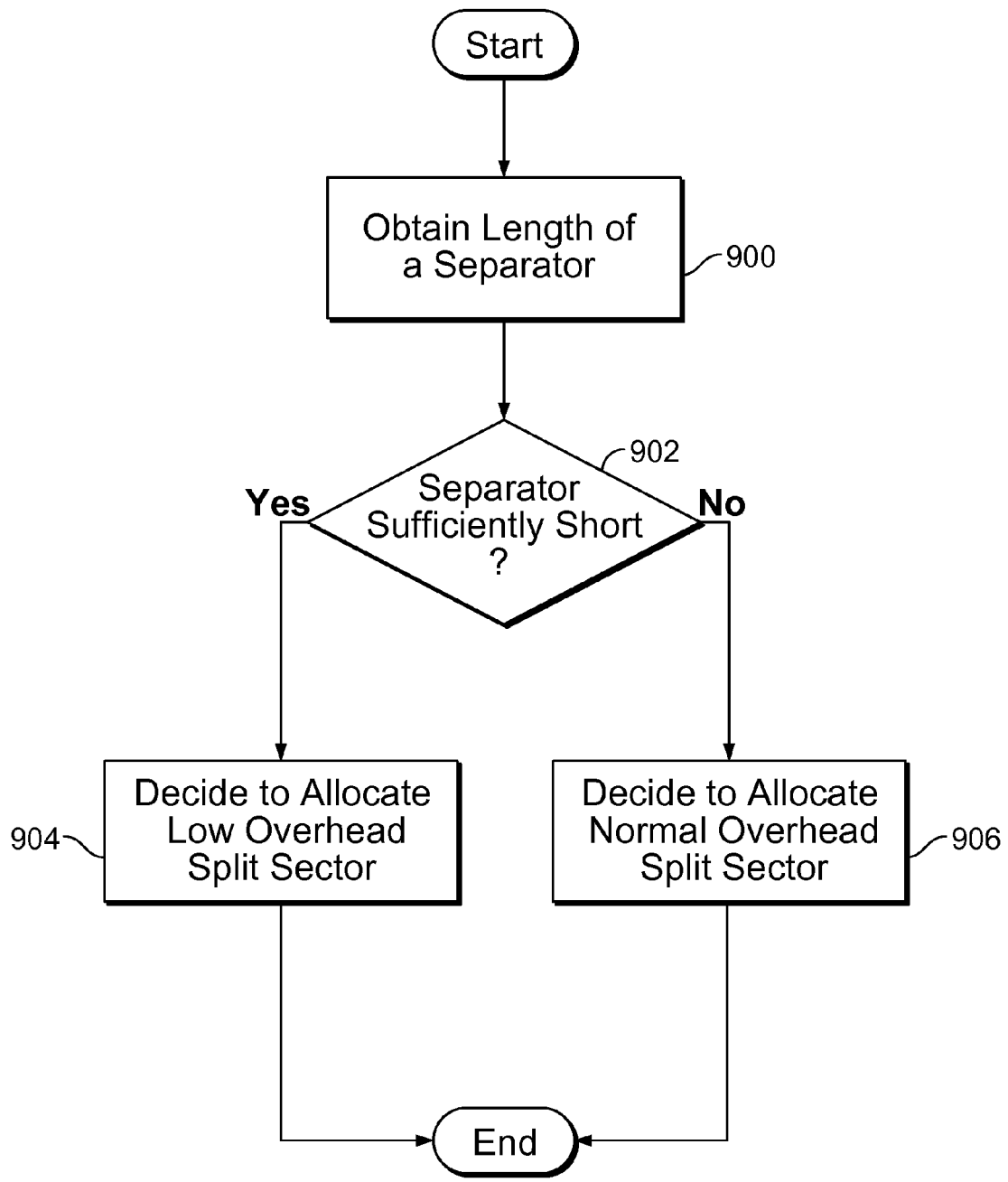
FIG. 9 is a flowchart illustrating an embodiment of deciding whether to allocate a low overhead split sector during formatting.

FIG. 9 is a flowchart illustrating an embodiment of deciding whether to allocate a low overhead split sector during formatting. In the example shown, it may have been decided during formatting to allocate a split sector because of a manufacturing defect. The illustrated process may be used to decide whether to use a low overhead split sector.

At 900, a length of a separator is obtained. The separator may be associated with a defect resulting from manufacturing, or may be associated with a servo wedge used in tracking. At 902, it is determined whether the separator is sufficiently short. If the length of a separator is too long, timing may be inaccurate when a timing loop is released and noise may be introduced into a read signal. A threshold may be used in decision 902. If the separator is sufficiently short, it is decided to allocate a low overhead split sector at 904. If not, it is decided to allocate a normal overhead split sector at 906.

Figure 10:
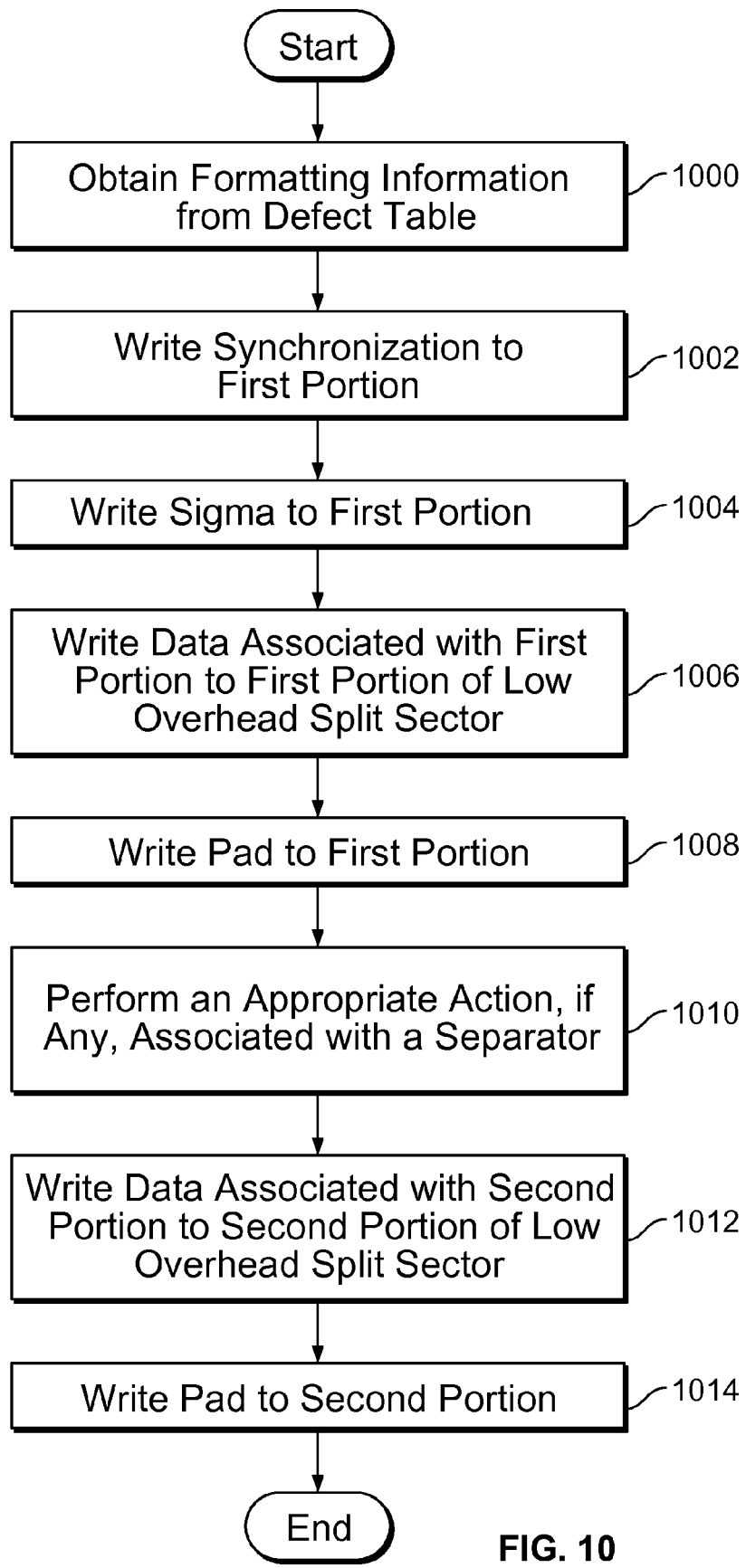
FIG. 10 is a flowchart illustrating an embodiment of writing to a low overhead split sector.

FIG. 10 is a flowchart illustrating an embodiment of writing to a low overhead split sector. In the example shown, data is written to a low overhead split sector comprising of two portions. In some embodiments, a low overhead split sector has three or more portions and the illustrated flowchart may be modified accordingly. At 1000, formatting information is obtained from a table. An entry with a "loh_split" command may be obtained from the table to determine the length of a separator between the two portions of the low overhead split sector and the capacity of the first portion. Using this information, data written to the low overhead split sector may be properly divided between the first portion and the second portion and processed, if needed, before the data is written to the sector.

At 1002, a synchronization is written to the first portion. A defined pattern may be used, so that when the synchronization is read back, timing may be obtained. A synchronization marker is written to the first portion at 1004. The synchronization marker may be a defined pattern that indicates the start of the data portion of a sector. At 1006, data associated with the first portion is written to the first portion of the low overhead split sector. For example, data assigned to the low overhead split sector may be divided into multiple parts based on the capacity of each portion. The capacity of the first portion may be determined from formatting information obtained from the table. A pad is written to the first portion at 1008.

At 1010, an appropriate action, if any, associated with a separator is performed. A separator may be ignored during a read of a low overhead split sector and, in some embodiments, a write to the separator is performed. In some embodiments, no action is performed. Considerations such as ease of implementation or performance may be used in determining an appropriate action for a particular embodiment.

At 1012, data associated with the second portion is written to the second portion of the low overhead split sector. This may be the remainder of the data assigned to the sector. A pad is written to the second portion at 1014.

Figure 11:
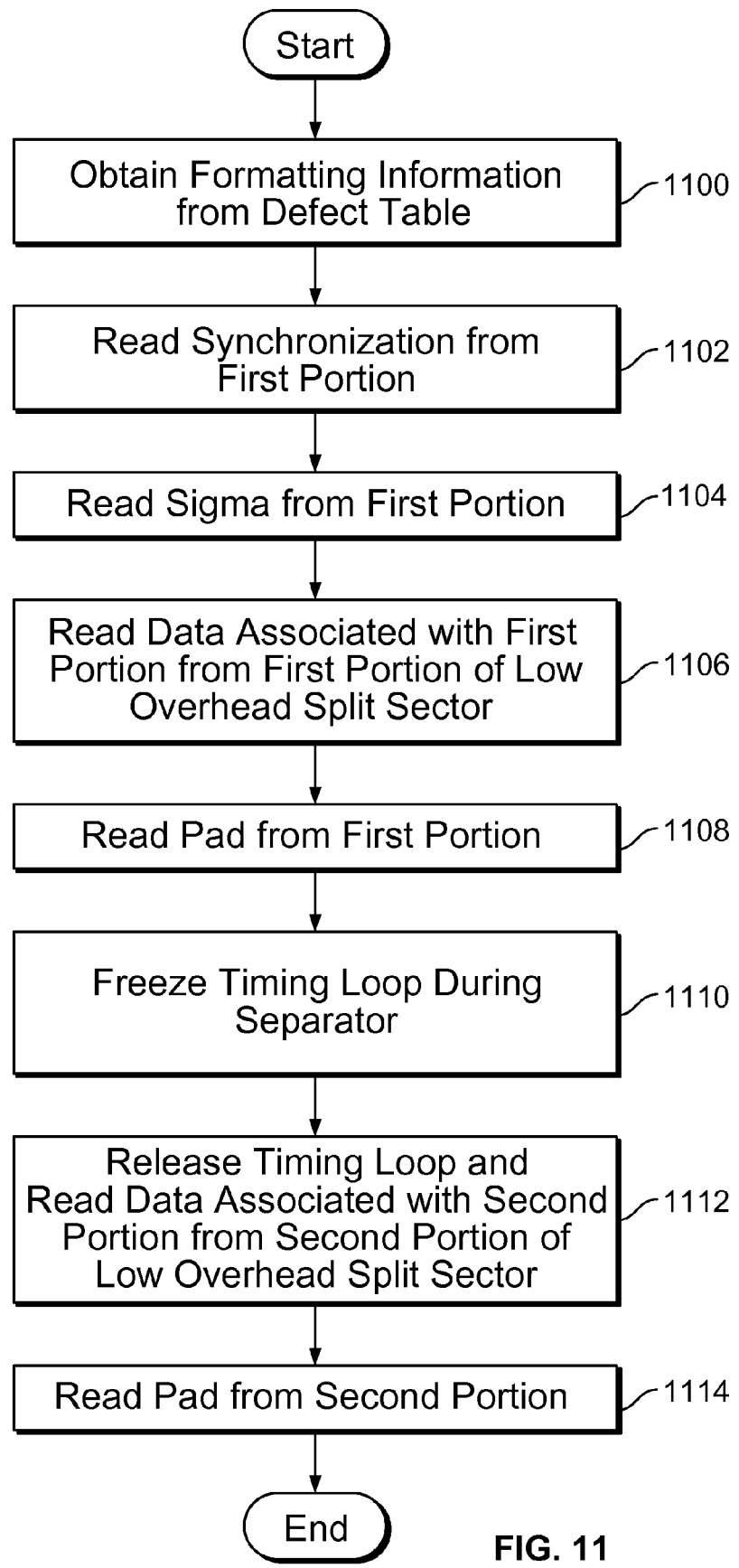
FIG. 11 is a flowchart illustrating an embodiment of reading from a low overhead split sector.

FIG. 11 is a flowchart illustrating an embodiment of reading from a low overhead split sector. In the example shown, timing obtained using the synchronization of the first portion may be used to access data stored in the second portion of a low overhead split sector. At 1100, formatting information is obtained from a table. An entry with a "loh_split" command may indicate the storage capacity of the first portion and the length of a separator between the first and second portion. Using this information, a device accessing a low overhead split sector may determine appropriate times or locations to perform the described functions.

At 1102, a synchronization is read from the first portion. A synchronization may be used to obtain timing used in accessing stored data. For example, a sampling clock may be determined and used to read data. A synchronization marker is read from the first portion at 1104. The synchronization marker may be a defined pattern indicating the start of data. At 1106, data associated with the first portion is read from the first portion of the low overhead split sector. Error correction processing may be applied to a read signal obtained from a read head. At 1108, a pad is read from the first portion. The pad may be used in error correction processing.

At 1110, a timing loop is frozen or paused during a separator. An appropriate method to pause the timing loop may be determined based on how the timing loop is implemented. The timing loop may be associated with adjusting a timing used in reading stored data. In some embodiments, a separator is not read. In some embodiments, a separator is read, but a read signal generated by a read head is not processed.

At 1112, the timing loop is released and data associated with a second portion is read from the second portion of a low overhead split sector. A pad is read from the second portion at 1114. Error correction processing is performed on the data read from the second portion, and the pad is used to conclude the error correction processing.

Figure 12:
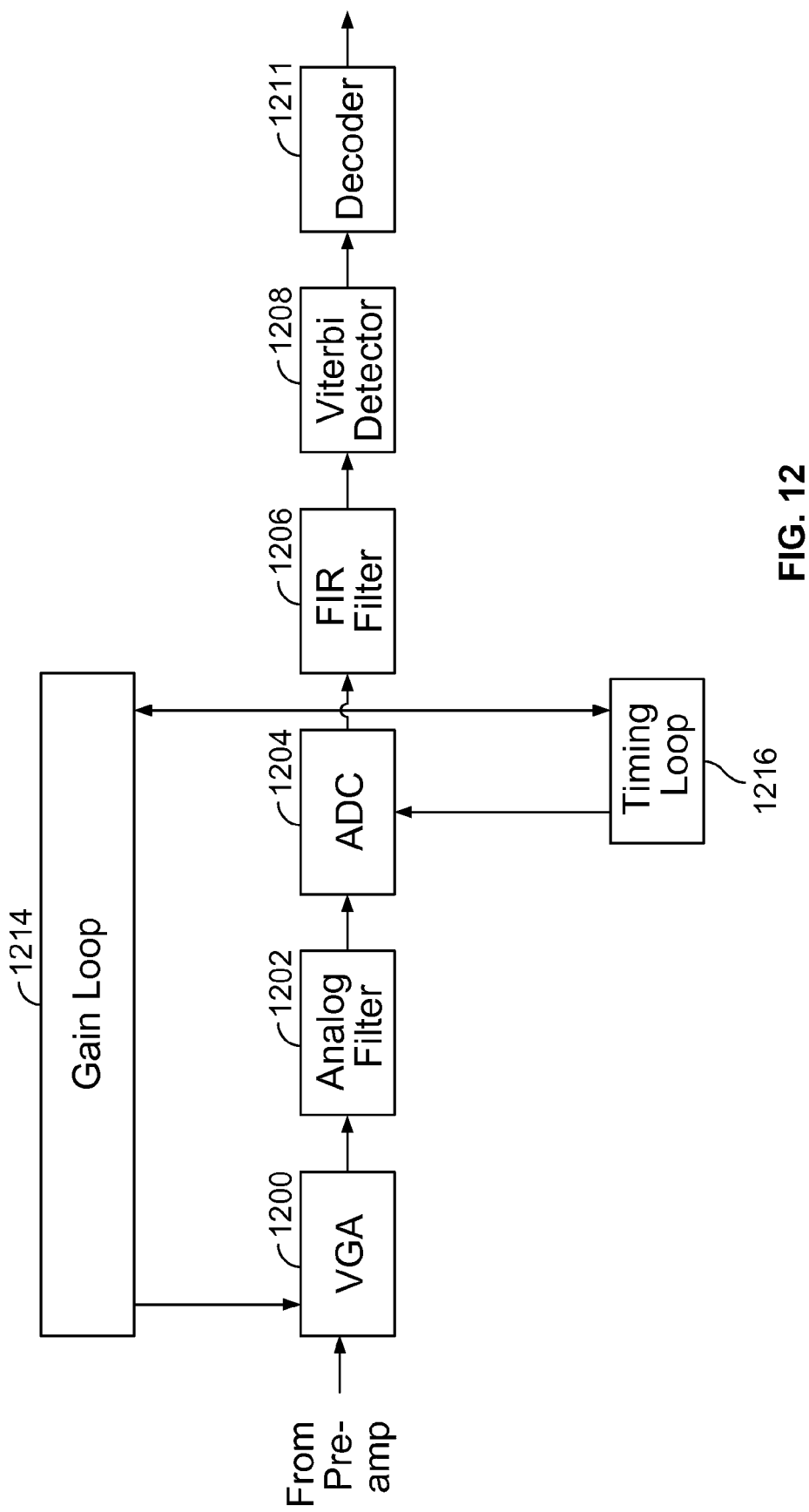
FIG. 12 is a block diagram illustrating an embodiment of a system associated with reading stored data.

FIG. 12 is a block diagram illustrating an embodiment of a system associated with reading stored data. In the example shown, some of the stored data may be read from a low overhead split sector. Components of the illustrated system may operate differently when processing data from a low overhead split sector, as compared to data from a data sector for example.

Variable gain amplifier (VGA) 1200 amplifies a read signal from a preamplifier. The read signal may be from a read head hovering above a track of a storage disk. The track may include a low overhead split sector. An amplified signal is output by VGA 1200 and passed to analog filter 1202. A filtered signal is passed from filter 1202 to analog to digital converter (ADC) 1204, which converts an analog signal to a digital signal.

The digital signal from ADC 1204 is filtered by finite impulse response (FIR) filter 1206. The filtered signal from filter 1206 is passed to Viterbi detector 1208. Error correction processing may be performed on a read signal. A read signal may include data stored in split sectors, including low overhead split sectors, and error correction processing may be applied to this data. Decoder 1211 is coupled to Viterbi detector 1208. The Viterbi corrected signal from Viterbi detector 1208 is decoded by decoder 1211.

Gain loop 1214 may control amplification of a read signal. Gain settings of VGA 1200 may be adjusted by gain loop 1214. Timing loop 1216 may adjust the timing used to read data from a storage disk. A sampling clock associated with ADC 1204 may be adjusted by timing loop 1216. Using the sampling clock, a digital signal may be obtained from an analog signal passed to ADC 1204.

Timing loop 1216 may be frozen or paused during a separator between a first portion and a second portion of a low overhead split sector. In some embodiments, the separator may include a manufacturing defect. In some embodiments, a separator may include a servo wedge. During the first portion of a low overhead split sector, timing loop 1216 may be enabled. A sampling clock associated with ADC 1204 may be adjusted using a synchronization in the first portion. During the separator between the first and second portion, timing loop 1216 may be paused until the second portion of a low overhead split sector. Timing loop 1216 may be released during the second portion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of formatting a storage disk including:
defining a first portion of a sector of the storage disk, wherein the first portion precedes a defect, having a length, and has a first length that varies based on a detected location of the defect;
deciding whether to include synchronization information in a second portion of the sector of the storage disk including by comparing the length of the defect to a threshold that is set to a value such that a timing loop is able to be paused without resulting in inaccurate timing;
defining the second portion of the sector of the storage disk, wherein the second portion follows the defect and has a second length that varies based on the detected location of the defect;
in the event it is decided to include synchronization information in the second portion of the sector, allocating a split sector format where a first portion of the sector includes synchronization information and a second portion of the sector includes synchronization information;
in the event it is decided not to include synchronization information in the second portion of the sector, allocating a low overhead split sector format where a first portion of the low overhead sector includes synchronization information and a second portion of the low overhead sector excludes synchronization information; and
storing information associated with the format of the sector.

2. A method as recited in claim 1, wherein the defect includes a manufacturing defect.

3. A method as recited in claim 1, wherein the first portion is used to store data.

4. A method as recited in claim 1, wherein data is stored magnetically in the storage disk.

5. A method as recited in claim 1, wherein the first portion and the second portion are associated with a same track.

6. A method as recited in claim 1, wherein the first portion contains at least one of the following: information associated with timing, a synchronization, information associated with error correction, or a pad.

7. A method as recited in claim 1, wherein a total storage capacity associated with the first portion and the second portion is fixed.

8. A method as recited in claim 1, wherein a total storage capacity associated with the first portion and the second portion is 512 bytes.

9. A method as recited in claim 1, wherein a defect portion, that is associated with the defect, is adjacent to the first portion and the second portion and has a defect portion length that varies based on a measured length of the defect.

10. A method as recited in claim 1, wherein a defect portion, that is associated with the defect, is adjacent to the first portion and the second portion and has a defect portion length that is fixed.

11. A method as recited in claim 1 further including:
receiving data to be stored in the sector;
determining a first set of data to be stored in the first portion; and
determining a second set of data to be stored in the second portion.

12. A method as recited in claim 1, wherein the stored information includes at least one of: an identifier associated with the sector, a length associated with the defect, or the first length.

13. A method as recited in claim 1, wherein storing the information includes storing in a formatting table associated with the storage disk.

14. A method as recited in claim 1, wherein the first portion contains a set of overhead information, other than the synchronization information, not contained in the second portion.

15. A method as recited in claim 1, wherein deciding includes comparing the length of the defect to a threshold, wherein in the event the length of the defect does not exceed the threshold, it is decided not to include synchronization information in the second portion of the sector.

16. A method as recited in claim 1 further comprising pausing the timing loop, used to adjust a sampling clock used in reading stored data, during a period associated with the defect so that information in the defect is ignored by the timing loop.

17. A method as recited in claim 1, wherein the synchronization information included in the first portion of the sector during allocation of the split sector format is longer than the synchronization information included in the second portion of the sector.

18. A system for formatting a storage disk including:
a processor configured to:
defining a first portion of a sector of the storage disk, wherein the first portion precedes a defect, having a length, and has a first length that varies based on a detected location of the defect;
decide whether to include synchronization information in a second portion of the sector of the storage disk including by comparing the length of the defect to a threshold that is set to a value such that a timing loop is able to be paused without resulting in inaccurate timing;
define the second portion of the sector of the storage disk, wherein the second portion follows the defect and has a second length that varies based on the detected location of the defect;
in the event it is decided to include synchronization information in the second portion of the sector, allocate a split sector format where a first portion of the sector includes synchronization information and a second portion of the sector includes synchronization information;
in the event it is decided not to include synchronization information in the second portion of the sector, allocate a low overhead split sector format where a first portion of the low overhead sector includes synchronization information and a second portion of the low overhead sector excludes synchronization information; and
store information associated with the format of the sector; and
the storage disk.

19. A system as recited in claim 18, wherein the first portion contains a set of overhead information, other than the synchronization information, not contained in the second portion.

20. A system as recited in claim 18, wherein the processor is configured to decide by comparing the length of the defect to a threshold, wherein in the event the length of the defect does not exceed the threshold, it is decided not to include synchronization information in the second portion of the sector.

21. A system as recited in claim 18, wherein the processor is further configured to pause the timing loop, used to adjust a sampling clock used in reading stored data, during a period associated with the defect so that information in the defect is ignored by the timing loop.

22. A system as recited in claim 18, wherein the synchronization information included in the first portion of the sector during allocation of the split sector format is longer than the synchronization information included in the second portion of the sector.

23. A computer program product for formatting a storage disk, the computer program product being embodied in a non-transitory computer readable storage medium and comprising computer instructions for:
defining a first portion of a sector of the storage disk, wherein the first portion precedes a defect, having a length, and has a first length that varies based on a detected location of the defect;
deciding whether to include synchronization information in a second portion of the sector of the storage disk including by comparing the length of the defect to a threshold that is set to a value such that a timing loop is able to be paused without resulting in inaccurate timing;
defining the second portion of the sector of the storage disk, wherein the second portion follows the defect and has a second length that varies based on the detected location of the defect;
in the event it is decided to include synchronization information in the second portion of the sector, allocating a split sector format where a first portion of the sector includes synchronization information and a second portion of the sector includes synchronization information;
in the event it is decided not to include synchronization information in the second portion of the sector, allocating a low overhead split sector format where a first portion of the low overhead sector includes synchronization information and a second portion of the low overhead sector excludes synchronization information; and
storing information associated with the format of the sector.

24. A computer program product as recited in claim 23, wherein the computer instructions for deciding include computer instructions for comparing the length of the defect to a threshold, wherein in the event the length of the defect does not exceed the threshold, it is decided not to include synchronization information in the second portion of the sector.

25. A computer program product as recited in claim 23 further comprising computer instructions for pausing the timing loop, used to adjust a sampling clock used in reading stored data, during a period associated with the defect so that information in the defect is ignored by the timing loop.

26. A computer program product as recited in claim 23, wherein the synchronization information included in the first portion of the sector during allocation of the split sector format is longer than the synchronization information included in the second portion of the sector.

* * * * *